FITZ WILLIAM SARGENT.
BRAKE SHOE.
APPLICATION FILED JAN. 23, 1912.

1,026,929.

Patented May 21, 1912.

Attest:

Inventor:
Fitz William Sargent
by George Cook Atty

UNITED STATES PATENT OFFICE.

FITZ WILLIAM SARGENT, OF MAHWAH, NEW JERSEY, ASSIGNOR TO EDWARD H. FALLOWS, OF NEW YORK, N. Y.

BRAKE-SHOE.

1,026,929.  Specification of Letters Patent.  Patented May 21, 1912.

Application filed January 23, 1912. Serial No. 672,891.

*To all whom it may concern:*

Be it known that I, FITZ WILLIAM SARGENT, a citizen of the United States, and a resident of Mahwah, in the county of Bergen and State of New Jersey, have made and invented certain new and useful Improvements in Brake-Shoes, of which the following is a specification.

My invention relates to brake shoes designed more particularly for use with railway cars and similar vehicles, and the objects thereof are to provide a brake shoe having a spirally wound wrought metal ribbon embedded in its body portion and arranged edgewise to the wearing face of the shoe; to provide an improved brake shoe having a recess in its body portion and which recess is filled with a non-metallic substance within which is embedded a similar spirally wound ribbon; to provide a brake shoe of the type above referred to which will be simple in construction and effective, and which may be easily and cheaply manufactured; and to provide such other improvements in and relating to brake shoes as are hereinafter described and claimed.

Figure 1:
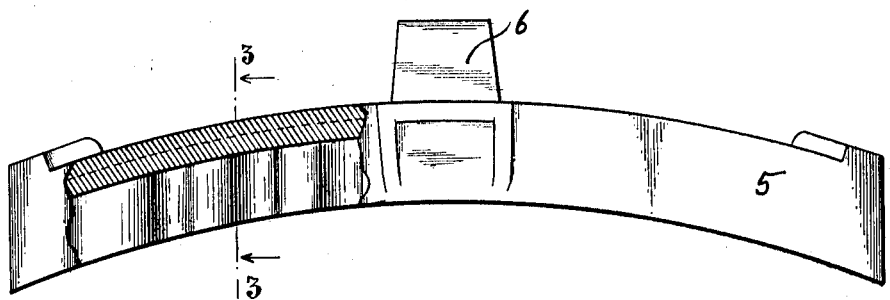
Figure 2:
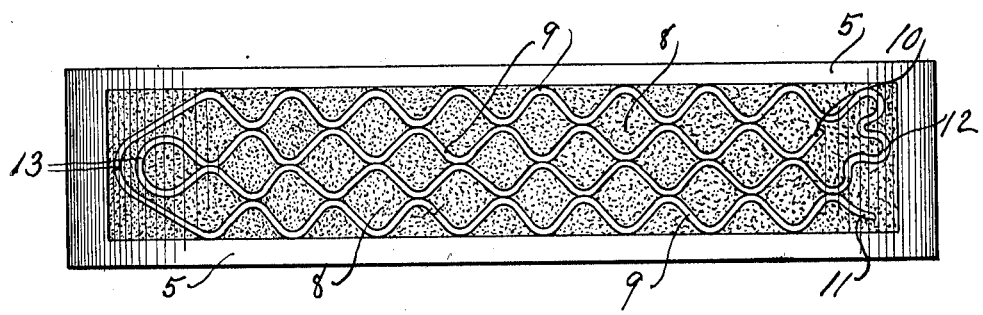
Figure 3:
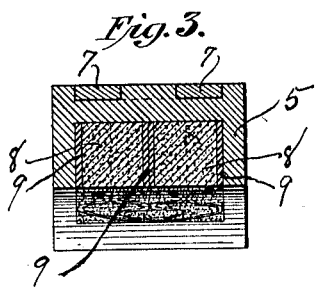

With the above and other objects of invention in view, and referring to the drawing accompanying and forming a part of this application; Figure 1 is a view showing a side elevation partly broken away to show features of internal construction of the preferred form of my improved brake shoe; Fig. 2 is a view showing the wearing face of my improved shoe, and, Fig. 3 is a view showing a section upon a transverse plane indicated by the line 3—3, Fig. 1.

In the drawing, the reference numeral 5 designates the body portion of my improved brake shoe, 6 is a lug whereby the shoe is secured to a brake head or equivalent support, and 7 is a steel back embedded in the rear face of the shoe, the lug and steel back, however, not being involved in the invention to which this application relates.

The body portion 5 is formed from cast metal, such as cast iron, and is provided with a recess in its front or wearing face, which recess is shown as extending longitudinally of, and throughout substantially the entire length of the shoe. The recess referred to is filled with a non-metallic substance indicated by the reference character 8, whereby a non-metallic insert is formed, and 9 is a wrought metal ribbon embedded in the non-metallic insert 8 and bent to provide a plurality of segments lying side by side and extending longitudinally of the shoe. The ribbon 9 is arranged edgewise to the wearing face of the shoe as best shown in Fig. 3, and is preferably corrugated as shown in order that wear upon the wheel with which the shoe is used may be uniformly distributed and the formation of grooves in the tread thereof avoided.

The ribbon 9 is preferably bent or wound into the form of a flattened spiral, the inner end of the ribbon being at 10 and the outer end at 11, Fig. 2. The purpose of this arrangement is to prevent the brake shoe or insert within which it is embedded from splitting along longitudinal planes, as it will be seen that portions of the ribbon (shown at 12 and 13) are thus provided which extend past the ends of intermediate segments of the ribbon and part-way across each end of the shoe. These end portions serve to prevent the formation and development of longitudinal cracks in the body of the shoe or insert, or along the joint between the ribbon and medium in which it is embedded, because of the transverse strengthening effect thus provided at the ends of the shoe, and serve also to prevent such cracks as may develop in the body of the shoe or insert in which the ribbon is embedded from extending clear to the ends of the shoe. The spirally wound ribbon therefore materially strengthens the shoe or insert transversely, and prevents it from splitting along longitudinal planes into two or more parts, and holds the parts together if such cracks develop.

It will be understood that the body of the shoe, the non-metallic insert, and the spirally wound insert are simultaneously worn away as the shoe is used, and that the character of the wearing face is such as to afford a maximum braking or retarding effect with a minimum of abrading action or injury as by the formation of grooves in the tread of the wheel with which the shoe is used.

In manufacturing the brake shoe of the specific form shown in the drawing, the ribbon 9 after being bent in the flattened or oblong spiral shown, is placed within the recess in the body portion 5 of the shoe, after which the non-metallic substance, in plastic form, is pressed into the spaces between the segments of the ribbon, and between the ribbon and the walls of the recess; or, the non-metallic substance and ribbon embedded therein may be first molded and pressed into an integral block, which block as a unit may be then placed in the recess in the body of the shoe and suitably anchored or secured therein.

While I have described the composition insert as being non-metallic, it will be understood that such term is used in contradistinction to metal, such as cast metal or the like, it being possible to secure good results with the shoe constructed as above described when the composition insert contains metallic particles, as iron borings, filings, etc., as one of the ingredients thereof.

Having thus described my invention, I claim and desire to secure by Letters Patent:—

1. A brake shoe having a spirally wound ribbon of wrought metal embedded in it and arranged edgewise with reference to its wearing face.

2. A brake shoe having a recess formed in its body portion and extending longitudinally thereof, a non-metallic insert contained within said recess, and a ribbon of wrought metal embedded in said insert and arranged edgewise with reference to the wearing face of the shoe, said ribbon being unconnected with the body portion of the shoe.

3. A brake shoe having a recess formed in its body portion and extending longitudinally thereof, a non-metallic insert contained within said recess, and a ribbon of wrought metal embedded in said insert and arranged edgewise with reference to the wearing face of the shoe, said ribbon being bent to provide a plurality of segments extending longitudinally of the shoe and the same being unconnected with the body portion of the shoe.

4. A brake shoe having a recess formed in its body portion and extending longitudinally thereof, an insert contained within said recess, and a ribbon of metal embedded in said insert and arranged edgewise with reference to the wearing face of the shoe, said ribbon being bent to provide a plurality of segments extending longitudinally of the shoe and other portions extending transversely to and located adjacent the ends of the shoe, and which transverse portions extend past the ends of intermediate segments of said ribbon.

5. A brake shoe having a recess formed in its body portion, an insert contained within said recess, and a spirally wound ribbon of metal embedded in said insert and arranged edgewise with reference to the wearing face of the shoe.

6. A brake shoe having a recess formed in its body portion and extending longitudinally thereof throughout substantially the entire length of the shoe, an insert contained within said recess, and a spirally wound ribbon of metal embedded in said insert and arranged edgewise with reference to the wearing face of the shoe.

7. A brake shoe having a spirally wound corrugated ribbon of metal embedded in it and arranged edgewise with reference to its wearing face.

8. A brake shoe having a recess formed in its body portion and extending longitudinally thereof, a non-metallic insert contained within said recess, and a corrugated ribbon of wrought metal embedded in said insert and arranged edgewise with reference to the wearing face of the shoe, said ribbon being unconnected with the body portion of the shoe.

9. A brake shoe having a recess formed in its body portion and extending longitudinally thereof, a non-metallic insert contained within said recess, and a corrugated ribbon of wrought metal embedded in said insert and arranged edgewise with reference to the wearing face of the shoe, said ribbon being bent to provide a plurality of segments extending longitudinally of the shoe and the same being unconnected with the body portion of the shoe.

10. A brake shoe having a recess formed in its body portion and extending longitudinally thereof, a non-metallic insert contained within said recess, and a corrugated ribbon of wrought metal embedded in said insert and arranged edgewise with reference to the wearing face of the shoe, said ribbon being bent to provide a plurality of segments extending longitudinally of the shoe, and other portions extending transversely to and located adjacent the ends of the shoe, and which transverse portions extend past the ends of intermediate segments of said ribbon.

11. A brake shoe having a recess formed in its body portion, a non-metallic insert contained within said recess, and a spirally wound corrugated ribbon of wrought metal embedded in said insert and arranged edgewise with reference to the wearing face of the shoe.

12. A brake shoe having a recess formed in its body portion and extending longitudinally thereof throughout substantially the entire length of the shoe, an insert contained within said recess, and a spirally wound corrugated ribbon of metal embedded in said
5 insert and arranged edgewise with reference to the wearing face of the shoe.

Signed at Mahwah township of Hohokus in the county of Bergen and State of New Jersey this 18th day of January A. D. 1912.

FITZ WILLIAM SARGENT.

Witnesses:
A. V. BRISTOL,
E. I. CAMERON.

Copies of this patent may be obtained for five cents each, by addressing the "Commissioner of Patents, Washington, D. C."